Feb. 11, 1936. L. F. BLUME 2,030,679
PROTECTION OF ELECTRIC CIRCUITS
Filed Aug. 17, 1934
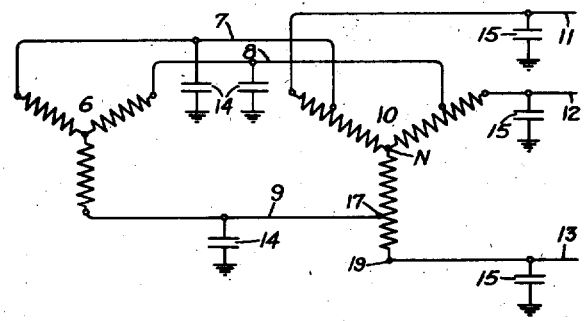
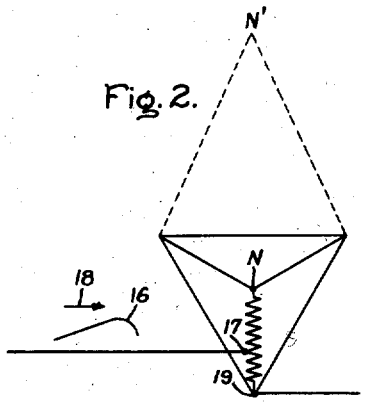
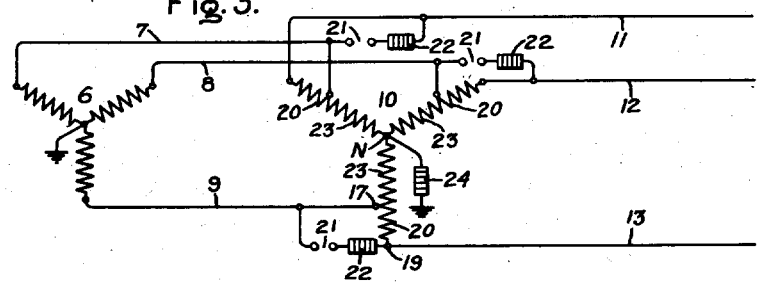
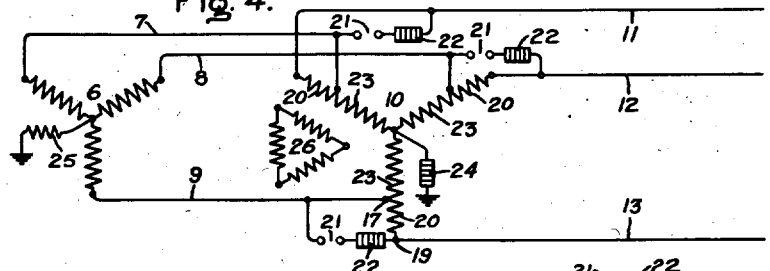
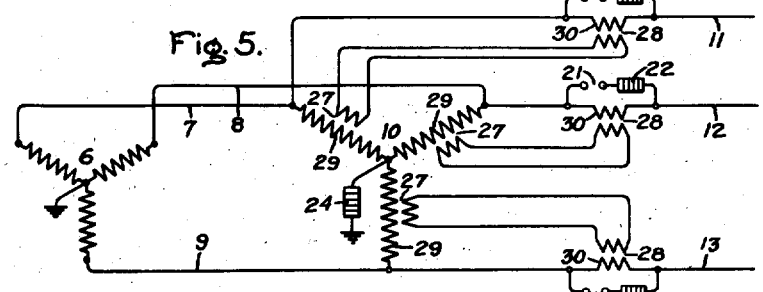
Inventor:
Louis F. Blume,
by Harry E. Dunham
His Attorney.

Patented Feb. 11, 1936

2,030,679

UNITED STATES PATENT OFFICE 2,030,679

PROTECTION OF ELECTRIC CIRCUITS

Louis F. Blume, Pittsfield, Mass., assignor to General Electric Company, a corporation of New York Application August 17, 1934, Serial No. 740,356

12 Claims. (Cl. 175—294)

My invention relates to improvements in the protection of electric circuits and more particularly to improvements for protecting transformers having series windings against transient voltage disturbances. An object of my invention is to provide an improved protective arrangement for stabilizing the neutral of such transformers to prevent inversion of the neutral under transient disturbances and for avoiding over-excitation of the transformer by transient disturbances acting across its series winding. This and other objects of my invention will appear in more detail hereinafter.

My invention will be better understood from the following description when considered in connection with the accompanying drawing and its scope will be pointed out in the appended claims.

In the accompanying drawing, Fig. 1 is a circuit diagram explanatory of my invention; Fig. 2 is a part circuit and part vector diagram explanatory of my invention; Fig. 3 illustrates diagrammatically a protective arrangement embodying my invention; and Figs. 4 and 5 illustrate other embodiments of my invention.

In Fig. 1, the star-connected windings of a polyphase generator 6, which may or may not be grounded, are connected through the phase conductors 7, 8, and 9 of an electric circuit to energize an auto-transformer 10 having an isolated neutral and star connected windings connected to the phase conductors 11, 12, and 13 of another electric circuit. The capacitances to ground of the conductors 7, 8, and 9 of the primary circuit are schematically indicated by condensers 14 and the capacitances to ground of the phase conductors 11, 12 and 13 of the secondary circuit are schematically illustrated by condensers 15. Voltage disturbances on the primary circuit conductors 7, 8, and 9 traveling towards the autotransformer 10 have in effect a grounded neutral by virtue of the line to ground capacitances 14. The secondary circuit conductors also have in effect a grounded neutral by virtue of the line to ground capacitances 15. The neutral of the autotransformer 10 is isolated because its capacitance to ground is negligible in comparison with the capacitances to ground of the phase conductors of the primary and secondary circuits. For transient voltages, therefore, it is the equivalent of an isolated neutral auto-transformer connected to a grounded system.

Let it be assumed that a potential disturbance, indicated in Fig. 2 by the curve 16 as having a steep wave front, arrives at 17 from the left as indicated by the arrow 18. The potential of the transformer winding terminal 19 will remain at ground or previous potential until the capacitance 15 of the phase conductor 13 can be charged. For a steep wave front or high-frequency impulse, the capacitance 15 of the conductor 13 will act as a short-circuit and will hold the terminal 19 at approximately ground potential. The point 17 assumes the potential of the incoming impulse while the terminal 19 is held at ground potential. Therefore, the full voltage of the incoming impulse appears across the small portion or series winding 17—19 of the auto-transformer. This voltage, which is many times the normal voltage on the series winding, greatly overexcites the transformer and will either raise or reverse the potentials of 17 and N relatively to the potential of the terminal 19, depending on the phase of the incoming transient relatively to the normal voltage on the series winding. Fig. 2 has been drawn on the basis that the incoming transient is in phase with the normal voltage on the series winding and the neutral N is displaced to the position N'. Obviously, a small overexcitation is sufficient to displace the neutral outside of the line voltage triangle. This is termed inversion of the neutral. The voltage from N' to ground becomes approximately as many times the incoming surge voltage as the turn ratio of 17—N to 17—19. When it is considered that line voltage disturbances produced by transients such as lightning, arcing grounds, or switching, are many times the normal line voltages and that these abnormal voltages may be magnified ten to fifty times by inversion, the seriousness of inversion voltages is obvious.

If the sytem neutral is grounded as at the generator 6, then the inversion phenomena may also occur at system frequency in case of a line ground on one of the conductors 11, 12, 13. Thus, if the conductor 13 becomes grounded, the terminal 19 of the series winding is at ground potential, but normally this is the potential of N. In other words, the potential of the terminal 19 is shifted to the normal potential of N. The excitation of the series winding 17—19 is accordingly reversed and magnified. The potential of N is now determined by the condition that the voltage across 17 and N must be opposite to the voltage across 17 and 19 and approximately in the turn ratio of these part windings.

In accordance with my invention, I provide a voltage responsive descharge means for so stabilizing the neutral of transformers having series windings as to prevent its inversion under transient disturbances and for minimizing to an economically safe degree the over-excitation of the transformer by transient disturbances acting across the series windings.

Referring now to the embodiment of my invention shown in Fig. 3, it will be apparent that the circuits 7—8—9 and 11—12—13 are connected in series relation through the series windings 20 of the auto-transformer 10. In accordance with my invention, I connect across these series windings, voltage responsive discharge means such as lightning arresters, each of which may comprise a suitable gap 21 and an impedance device 22 whose resistance will rapidly or disproportionately decrease with increase in voltage. Such a resistance material suitable for the purpose is disclosed in United States Letters Patent 1,822,742 granted September 8, 1931, to the assignee of the present invention.

The impedance characteristic of this material is continuously variable and may be expressed by the equation $$R = \frac{1}{KE^{n-1}},$$

where R represents the resistance of the material, E the voltage across the material, K a constant, and $n$ a number greater than 1. The discharge means may be merely gaps or suitable resistance devices or both. Where the discharge means is to be built within the transformer casing, the resistance device alone may be found preferable. While the discharge means permit ready passage of the impulses without concentration of voltage across the series windings 20, nevertheless the impedance drop of the discharge means, as well as the breakdown characteristic produces a certain amount of voltage across the series winding 20. This tends to be magnified through the common windings 23 approximately in the ratio of common to series turns, thereby tending to invert the neutral of the auto-transformer, although with a very much reduced value as compared with what would occur without the discharge means.

Further in accordance with my invention, in order more definitely to stabilize the neutral of the auto-transformer, I ground it through a voltage responsive discharge means 24 of any suitable type, for example, a resistance material of the type disclosed in the above mentioned patent. The voltage rating of the arresters 21—22 will not be that of the series windings 20 but preferably that of the line to neutral voltage of the system since in a grounded system the discharge means will be subjected to line to neutral voltage in case of line grounds and they must be capable of withstanding such voltage without destruction. Where the system voltages cannot be maintained under fault conditions a lower voltage rating may be used. Depending on the ratio of the series voltage per leg to the line to neutral voltage, such a discharge device will, under normal circuit conditions, permit across the series winding a certain low frequency inversion voltage stress and a certain other high frequency inversion voltage stress. The discharge devices will be proportioned to limit the maximum voltage across the series windings to a predetermined value less than the insulation strength or breakdown value of the series windings. When on a grounded system the neutral of the auto-transformer is directly grounded, displacement of the neutral is definitely prevented. A fault on either the high or low voltage circuit is a short-circuit on the system, and will be promptly opened. In an isolated neutral system, a lower setting of the discharge device may be permissible as line to neutral faults do not overexcite the series windings 20, since there is no inversion at the power frequency if the neutral 6 is ungrounded, but even here line to line faults are the limiting feature as they impress 50% of the line voltage on each series winding. Inasmuch as this value is not a great deal different from the value of 57.7% for grounded circuits, from a practical standpoint, the same discharge device may be considered for each case.

The impedance of the auto-transformer neutral grounding device 24 for an otherwise isolated neutral system is determined by the value of the transient voltage which the system insulation and the discharge devices 21—22 will permit across the series windings, the voltage magnification which occurs due to the turn ratio between the series and common windings, the current which will be passed by the impedance device 24 and the voltages resulting therefrom. In proportioning the impedance device 24, it is also desirable to consider line regulation as well as the regulation due to the leakage impedance of the auto-transformer for the transient in order to be certain that the impedance device 24 will be adequate to reduce the voltages with economy. In other words, the impedance device 24 can be made smaller since the abnormal voltages at either power frequency or transient frequency are less in consequence of the self-regulation due to the line impedance and the leakage impedance of the transformer. Where the system is grounded through an appreciable impedance 25, as shown in Fig. 4, the system neutral cannot be expected to be perfectly stable. If the auto-transformer is solidly grounded in such a case, an undue strain at power frequency may be impressed on the discharge devices 21—22 by a shift of the system neutral and large overexcitation of one or more legs of the transformer. To ground the auto-transformer neutral through the device 24 would tend to invert the power frequency neutral of the auto-transformer and force the impedance device 24 to stabilize this. This might lead to overheating of the impedance device and consequent damage. It is of course understood that the discharge devices 21—22 and the impedance device 24 are intended primarily for transient voltages and not for power frequency stabilization. For a more effective stabilization of the auto-transformer over longer periods of time, the auto-transformer may be provided with a tertiary delta winding 26 of a sufficiently low impedance to prevent power frequency inversion of the auto-transformer neutral. The auto-transformer neutral may then be grounded through the neutral impedance device 24 as shown. If the auto-transformer neutral were solidly grounded, then the auto-transformer by virtue of its low impedance tertiary winding would act as a grounding transformer for the system and might be destroyed. The impedance device 24 is capable of withstanding leg voltage without drawing undue current. It will be clear that an auto-transformer equipped with a low impedance tertiary 26, a grounding impedance 24 and discharge devices 21—22 would in general be satisfactory on any kind of system. However, on circuits which are definitely isolated or solidly grounded, the cost of the tertiary winding may be saved by the arrangements described in connection with Fig. 3.

While in the foregoing simple auto-transformers were considered with the series and common windings on the same core, it will be obvious that my invention is applicable when insulating transformers 27 and 28 are interposed between the series and common circuits 29 and 30 respectively, as shown for example in Fig. 5.

What I claim as new and desire to secure by Letters Patent of the United States, is:

1. In combination two electric circuits of different operating voltages, transforming means provided with a neutral and including windings connecting said circuits directly in series with each other, means connected in parallel relation with said windings for limiting voltage differences between said two circuits to a predetermined value, and voltage responsive discharge means connected between said neutral and ground.

2. In combination two electric circuits, an auto-transformer connecting said circuits and having a neutral, means connected in parallel relation with the series winding of said auto-transformer for limiting transient voltage differences between said circuits to a predetermined value, and voltage responsive discharge means connected between said neutral and ground for limiting transient voltage differences between the neutral and ground to a predetermined value.

3. In combination two polyphase circuits, an auto-transformer interconnecting said circuits and having a neutral, voltage responsive discharge means connected across the series windings of said auto-transformer and proportioned to conduct substantially no current under the normal voltage of said series windings and to limit any transient voltage difference between said circuits to a predetermined value, and voltage responsive discharge means connected between said neutral and ground.

4. In combination two polyphase circuits, an auto-transformer interconnecting said circuits and having a neutral, voltage responsive discharge means connected across the series windings of said auto-transformer and proportioned to conduct substantially no current under the normal line to neutral voltage of one of said circuits and to limit any transient voltage difference between said circuits to a predetermined value and means connected between the neutral of said auto-transformer and ground for limiting voltage differences between the neutral of said auto-transformer and ground to a predetermined value.

5. In combination two electric circuits of different operating voltages, one of said circuits being effectively grounded, an auto-transformer interconnecting said circuits and having neutral, voltage responsive discharge means connected in parallel with the series windings of said auto-transformer for limiting transient voltage differences between said two circuits to a predetermined value, and voltage responsive discharge means connected between said neutral and ground and having an impedance characteristic which decreases disproportionately with increase in voltage.

6. In combination two three-phase circuits, a three-phase auto-transformer having star-connected windings interconnecting said circuits, voltage responsive discharge means connected across the series windings of said auto-transformer and proportioned to conduct substantially no current under the normal voltage of said series windings and to limit any transient voltage difference between said circuits to a predetermined value, and voltage responsive discharge means connected between the neutral of said auto-transformer and ground.

7. In combination two three-phase circuits, a three-phase auto-transformer having star-connected windings interconnecting said circuits, delta connected auxiliary windings on said auto-transformer, voltage responsive discharge means connected in parallel with the series windings of said auto transformer, and voltage limiting means connected between the neutral of said auto-transformer and ground.

8. In combination two polyphase circuits, transforming means conductively coupling said circuits and having a neutral, voltage responsive discharge means connected across the windings of said transforming means and proportioned to conduct substantially no current under the normal line to neutral voltage of one of said circuits and to limit any transient voltage difference between said circuits to a predetermined value, and means connected between the neutral of said transforming means and ground for limiting voltage differences between the neutral of said transforming means and ground to a predetermined value.

9. In combination, two electric circuits of different operating voltages, transforming means for connecting said circuits directly in series with each other provided with a neutral, voltage responsive discharge means for shunting transient discharge currents from a portion of said transforming means and voltage responsive discharge means connected between said neutral and ground.

10. In combination, two electric circuits of different operating voltages, transforming means for connecting said circuits directly in series with each other and voltage responsive discharge means having a continuously variable impedance characteristic which decreases disproportionately with increase in voltage for shunting transient discharge currents from a part of the windings of said transforming means whereby to prevent abnormal voltages, magnified by inversion on the rest of the windings.

11. In combination, two electric circuits, an auto-transformer connecting said circuits, and voltage responsive discharge means having a continuously variable impedance characteristic which decreases disproportionately with increase in voltage connected across the series windings of said auto-transformer for shunting transient voltage discharge currents from said windings whereby to prevent abnormal voltages, magnified by inversion, on the rest of the windings.

12. In combination, two electric circuits, an auto-transformer connecting said circuits and having a neutral, voltage responsive discharge means having a continuously variable impedance characteristic which decreases disproportionately with increase in voltage connected across the series windings of said auto-transformer for shunting transient discharge currents therefrom and voltage responsive discharge means having a continuously variable impedance characteristic which decreases disproportionately with increase in voltage connected between said neutral and ground for passing transient discharge currents.

LOUIS F. BLUME.